United States Patent
Jeong et al.

(10) Patent No.: US 10,886,798 B2
(45) Date of Patent: Jan. 5, 2021

(54) STATOR SUPPORT MEMBER OF ROTATING ELECTRICAL MACHINE AND METHOD OF MANUFACTURING THE SAME

(71) Applicants: HYUNDAI MOTOR COMPANY, Seoul (KR); KIA MOTORS CORPORATION, Seoul (KR)

(72) Inventors: Myung Kyu Jeong, Seoul (KR); Jae Min Yu, Incheon (KR); Ga Eun Lee, Seongnam-si (KR); Young Jin Seo, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 335 days.

(21) Appl. No.: 15/708,639

(22) Filed: Sep. 19, 2017

(65) Prior Publication Data
US 2018/0138762 A1  May 17, 2018

(30) Foreign Application Priority Data
Nov. 15, 2016  (KR) .......................... 10-2016-0151704

(51) Int. Cl.
*H02K 1/20*  (2006.01)
*H02K 5/20*  (2006.01)
*H02K 1/18*  (2006.01)
*H02K 15/14*  (2006.01)

(52) U.S. Cl.
CPC ............... *H02K 1/20* (2013.01); *H02K 1/185* (2013.01); *H02K 5/20* (2013.01); *H02K 15/14* (2013.01)

(58) Field of Classification Search
CPC .......... H02K 1/20; H02K 1/185; H02K 15/14; H02K 5/20
See application file for complete search history.

(56) References Cited

U.S. PATENT DOCUMENTS

| | | | |
|---|---|---|---|
| 2009/0079279 A1* | 3/2009 | Cheng | H02K 1/20 310/54 |
| 2013/0342046 A1* | 12/2013 | Hyun | H02K 9/19 310/54 |
| 2016/0172940 A1* | 6/2016 | Weis | H02K 9/19 310/43 |
| 2017/0025911 A1* | 1/2017 | Jewell | H02K 3/24 |
| 2017/0373547 A1* | 12/2017 | Fujihira | H02K 1/20 |
| 2018/0048207 A1* | 2/2018 | Ohashi | H02K 5/20 |

FOREIGN PATENT DOCUMENTS

KR  10-2010-0011738  2/2010

* cited by examiner

*Primary Examiner* — Thienvu V Tran
*Assistant Examiner* — Bart Iliya
(74) *Attorney, Agent, or Firm* — Brinks Gilson & Lione

(57) ABSTRACT

A stator support member of a rotating electrical machine is provided with a cooling channel formed in the stator support member to cool a stator. The stator support member is manufactured to have the cooling channel of a hermetically sealed structure so that a cooling fluid may flow along the cooling channel. In particular, the support member having the cooling channel is divided into a ring-shaped outer part and a ring-shaped inner part (two-piece type) and the separately manufactured ring-shaped outer part and inner part are combined together.

4 Claims, 5 Drawing Sheets

[ CROSS-SECTION TAKEN ALONG LINE D-D ]

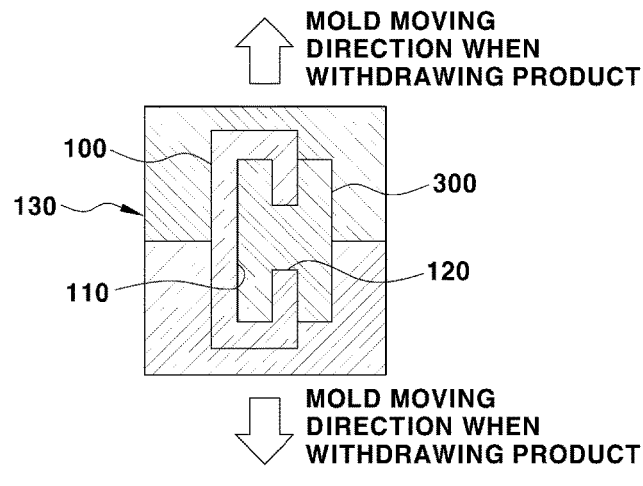
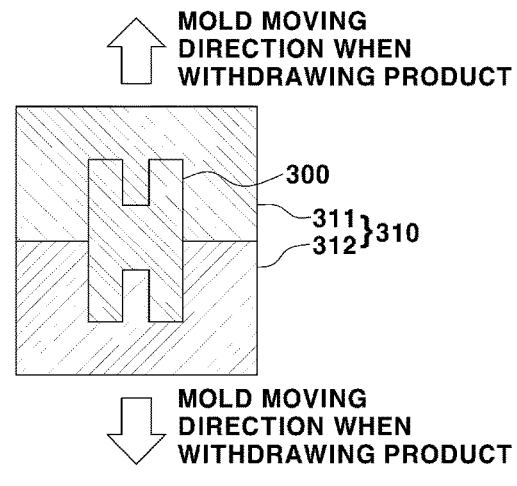
FIG. 2A  FIG. 2B
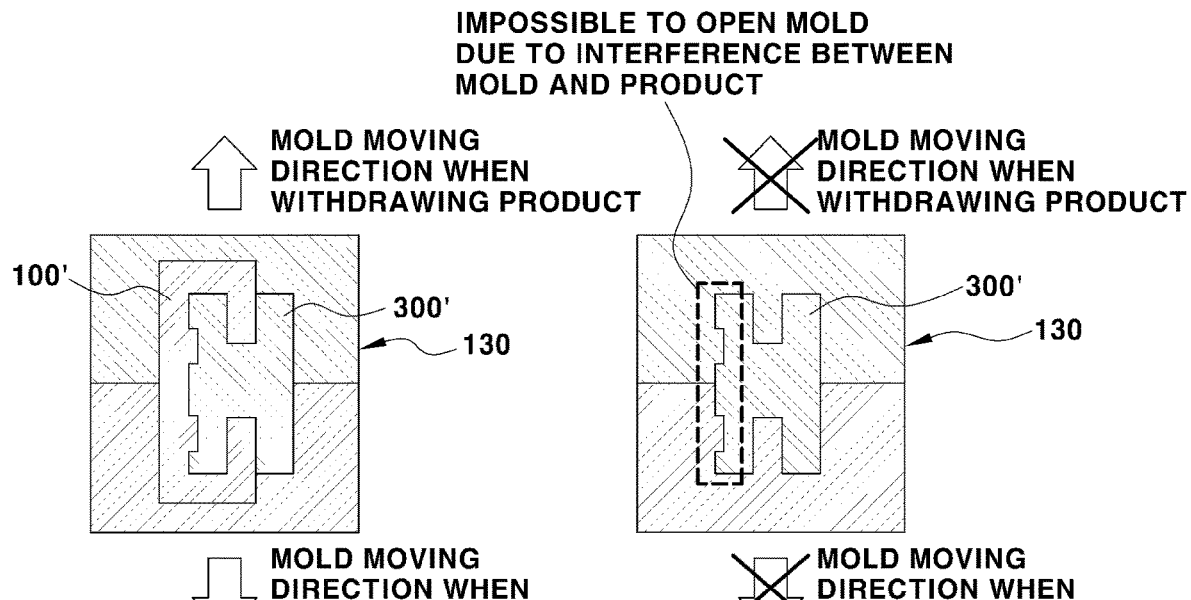
FIG. 3A  FIG. 3B

[ CROSS-SECTION TAKEN ALONG LINE A-A ]

[ CROSS-SECTION TAKEN ALONG LINE B-B ]

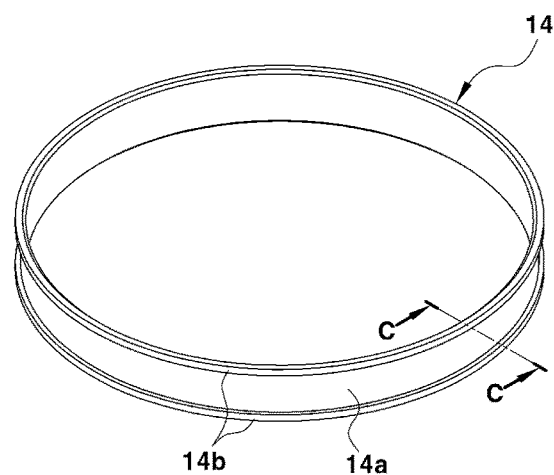
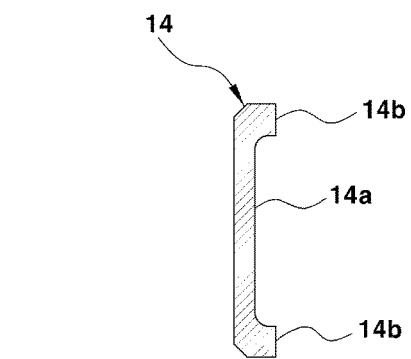
[ CROSS-SECTION TAKEN ALONG LINE C-C ]
FIG. 6A  FIG.6B
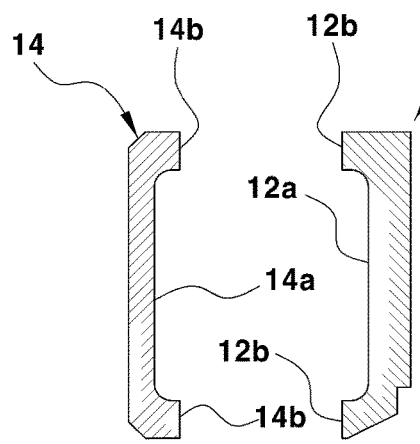
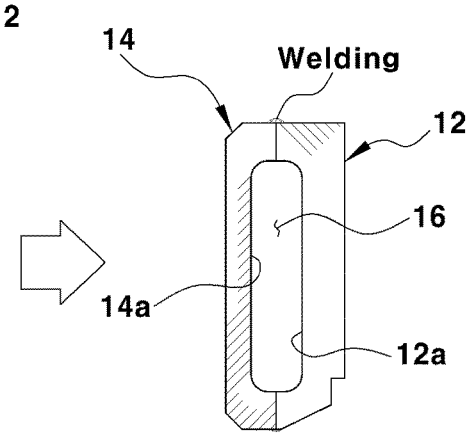
[ BEFORE BONDING ]  [ AFTER BONDING ]
FIG. 7A  FIG. 7B

[ CROSS-SECTION TAKEN ALONG LINE D-D ]

[ CROSS-SECTION TAKEN ALONG LINE E-E ]

STATOR SUPPORT MEMBER OF ROTATING ELECTRICAL MACHINE AND METHOD OF MANUFACTURING THE SAME

CROSS-REFERENCE TO RELATED APPLICATION

This application claims the benefit of and priority to Korean Patent Application No. 10-2016-0151704, filed on Nov. 15, 2016, the entire contents of which are incorporated herein by reference.

FIELD

The present disclosure relates to a stator support member of a rotating electrical machine and a method of manufacturing the same.

BACKGROUND

The statements in this section merely provide background information related to the present disclosure and may not constitute the related art.

In general, an electrical machine means energy conversion apparatus which converts electrical energy into dynamic energy or converts dynamic energy into electrical energy, and, for example, includes a motor and a generator.

In eco-friendly vehicles, such as electric vehicles, hybrid electric vehicles, fuel cell vehicles, etc., a motor is used as a driving source to drive a vehicle. A driving motor for hybrid electric vehicles employs a concentrated winding segmented core type stator.

The concentrated winding segmented core type stator includes a plurality of segmented cores on which coils are wound, the segmented cores being arranged in a ring shape and press-fitted into a ring-shape support member so as to support such an arrangement structure.

Support members are divided into support members having a simple structure to support a stator, and support members provided with a cooling channel to cool a stator, which generates a large amount of heat when a motor is operated. Further, support members provided with a cooling channel are divided into support members provided with a cooling channel formed at the inside thereof and support members provided with a cooling channel formed at the outside thereof.

A support member provided with a cooling channel formed at the inside thereof is structurally manufactured only by casting using a core material formed of sand and thus has limitations in manufacture. The shape of a cooling channel wall part surrounding the cooling channel is restricted due to the limitations in manufacture, and quality inspection of the stator support member after casting is restricted due to such a structure with the cooling channel provided at the inside of the stator support member, thus causing difficulty in inspection.

SUMMARY

The present disclosure addresses the above-described problems associated with the related art and provides a stator support member of a rotating electrical machine, which is manufactured to have a cooling channel of a hermetically sealed structure formed therein so that a cooling fluid may flow along the cooling channel. The stator support member having the cooling channel therein may be divided into a ring-shaped outer part and a ring-shaped inner part (two-piece type) based on the cooling channel and then the separately manufactured outer part and inner part are combined together. The present disclosure also provides a method of manufacturing the stator support member.

In one aspect, the present disclosure provides a stator support member of a rotating electrical machine to support a stator formed of a plurality of segmented cores which is arranged in a ring shape and around which coils are wound. The stator support member includes a ring-shaped outer part provided with a first cooling channel wall surface part formed on the inner circumferential surface thereof, a ring-shaped inner part provided with a second cooling channel wall surface part formed on the outer circumferential surface thereof, and a cooling channel surrounded with the first cooling channel wall surface part and the second cooling channel wall surface part by combining the ring-shaped outer part and the ring-shaped inner part together.

In one form, one or more protrusions may be formed on at least one of the first cooling channel wall surface part or the second cooling channel wall surface part, and the protrusions may be formed in the shape of ribs extending in the circumferential surface of the first cooling channel wall surface part or the second cooling channel wall surface part.

In one aspect, the present disclosure provides a method of manufacturing a stator support member of a rotating electrical machine to support a stator formed of a plurality of segmented cores which is arranged in a ring shape and around which coils are wound. The method includes: separately forming a ring-shaped outer part provided with a first cooling channel wall surface part formed on the inner circumferential surface thereof, and a ring-shaped inner part provided with a second cooling channel wall surface part formed on the outer circumferential surface thereof; and forming a cooling channel surrounded with the first cooling channel wall surface part and the second cooling channel wall surface part by combining the ring-shaped outer part and the ring-shaped inner part together while the first cooling channel wall surface part and the second cooling channel wall surface part face each other.

In one form, first bonding surface parts may be formed at both side ends of the first cooling channel wall surface part of the ring-shaped outer part, second bonding surface parts may be formed at both side ends of the second cooling channel wall surface part of the ring-shaped inner part, and, in the forming of the cooling channel, the ring-shaped outer part and the ring-shaped inner part may be fixed to each other by welding under the condition that the first bonding surface parts and the second bonding surface parts contact each other.

In another form, the ring-shaped outer part and the ring-shaped inner part may be ring-shaped structures having a simple ⊏-shaped longitudinal-section without a separate inner shape and be thus processed by forging, and defects caused when casting is carried out may be avoided.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 2A-2B are schematic views illustrating molds to mold the support member and a core material of the conventional rotating electrical machine;

FIGS. 3A-3B are views illustrating limitations in manufacturing a conventional support member;

FIG. 6A is a view illustrating an inner part of the stator support member in one form of the present disclosure;

FIG. 6B is a cross-sectional view taken along line C-C of FIG. 6A;

FIGS. 7A-7B are views illustrating a cooling channel in a complete state formed by combining the outer part and the inner part together in one form of the present disclosure;

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

The drawings described herein are for illustration purposes only and are not intended to limit the scope of the present disclosure in any way.

DETAILED DESCRIPTION

Hereinafter reference will now be made in detail to various forms of the present disclosure, examples of which are illustrated in the accompanying drawings and described below. While the present disclosure will be described in conjunction with exemplary forms, it will be understood that the present description is not intended to limit the present disclosure to the exemplary forms. On the contrary, the present disclosure is intended to cover not only the exemplary forms, but also various alternatives, modifications, equivalents and other forms within the spirit and scope of the present disclosure.

First, in order to better understand the present disclosure, a structure of a stator support member of a rotating electrical machine, manufactured using a core mold, and a method of manufacturing the same will be described.

Figure 1A:
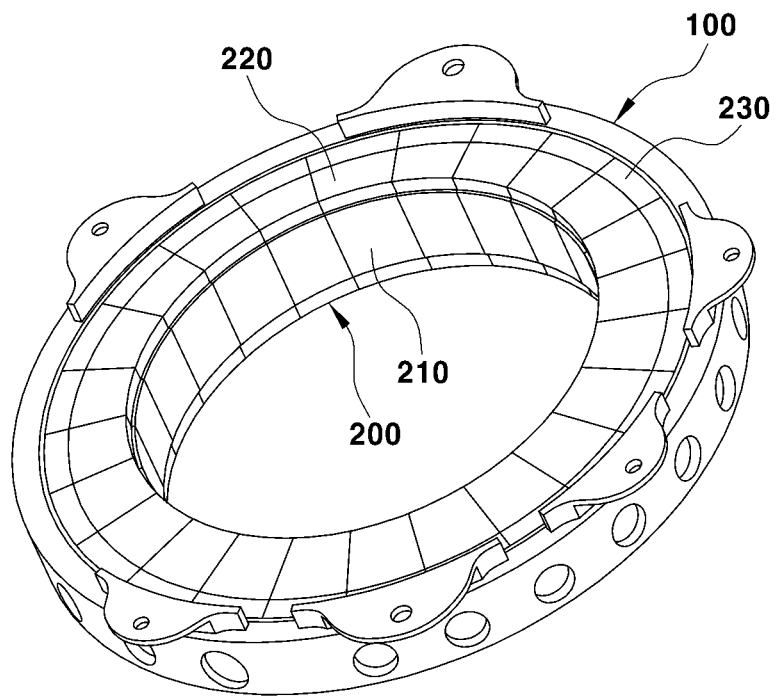
FIG. 1A is a perspective view of an assembled state between a stator and a support member of a conventional rotating electrical machine.
Figure 1B:
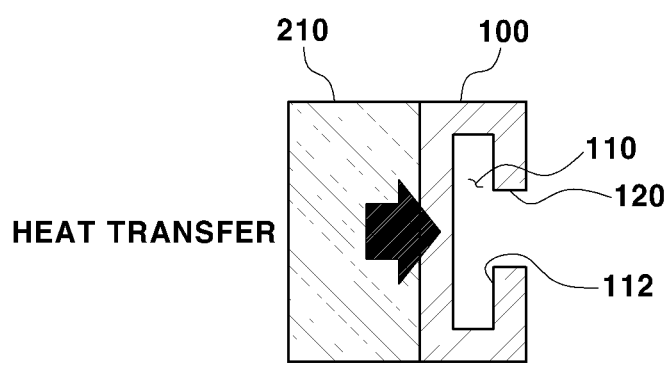
FIG. 1B is a schematic view illustrating disposition between the stator and the support member of the conventional rotating electrical machine.

As exemplarily shown in FIGS. 1A-1B, a stator support member 100 serves to support a plurality of segmented cores 210 arranged in a ring shape so as to fix a ring-shape arrangement structure.

A concentrated winding segmented core type stator 200 includes the segmented cores 210 on which coils 220 are wound, and the segmented cores 210 on which coils 220 are wound are arranged in a ring shape and press-fitted into the stator support member 100 so as to support such a ring-shaped arrangement structure.

In order to cool the stator 200 which generates a large amount of heat when the rotating electrical machine is operated, the stator support member 100 is provided with a cooling channel 110 formed therein (with reference to FIG. 1B), and the cooling channel 110 is formed in a shape extending in the circumferential direction of the stator support member 100, i.e., in a ring shape. A plastic bobbin 230 for electrical insulation between the stator support member 100 and the stator 200 is provided between the stator support member 100 and the stator 200.

Such a support member 100 provided with the cooling channel 110 formed therein is formed as an one piece type and is thus manufactured by gravity die casting using a core material formed of sand. As exemplarily shown in FIG. 2A, the stator support member 100 provided with the cooling channel 110 formed therein is molded as an one piece type by injecting a casting resin in a molten state into a casting mold 130 under the condition that a core material 300 is put into the casting mold 130 and, after completion of molding of the stator support member 100, the core material 300 and the stator support member 100 are withdrawn from the casting mold, and then the core material 300 is removed from the stator support member 100. Here, the core material 300 located in the cooling channel 100 is crushed and removed through a flushing hole 120 of the stator support member 100.

The core material 300 is molded to have a designated shape by injecting sand mixed with a curing agent, etc. into a core mold 310 and then curing the mixture and, as exemplarily shown in FIG. 2B, after completion of molding, the core material 300 is withdrawn from the core mold 310 by moving an upper die 311 and a lower die 312 of the core mold 310 in opposite directions.

Since the movement directions of the upper and lower dies 311 and 312 of the core mold 310 should be considered when the core material 300 is withdrawn from the core mold 310, the shape of the core material 300 is structurally restricted. As shown in FIGS. 3A-3B, in order to add a shape such as a cooling fin to a support member 100', if a core material 300' is molded by reflecting a structure corresponding to a shape added to the support member 100,' the core material 300' may not be withdrawn from the core mold 310 due to interference between the core mold 310 and the core material 300'.

The shape of a cooling channel wall part 112 surrounding the cooling channel 110 of the stator support member 100 is restricted due to such limitations in manufacture, and quality inspection of the stator support member 100 after casting is restricted due to such a structure with the cooling channel 110 provided at the inside of the stator support member 100, thus causing difficulty in inspection.

Therefore, in the present disclosure, a stator support member is manufactured by separately forming two ring-shaped structures, i.e., a ring-shaped outer part and a ring-shaped inner part, and then combining the outer and inner parts together and, particularly, the outer part and the inner part divided from each other in the longitudinal direction based on a cooling channel of the stator support member so as to be concentric with each other are individually formed and, when the outer part and the inner part are bonded, the cooling channel of the stator support member having a sealed structure is completed.

Hereinafter reference will now be made in detail to various forms of the present disclosure, examples of which are illustrated in the accompanying drawings and described below.

Figure 4A:
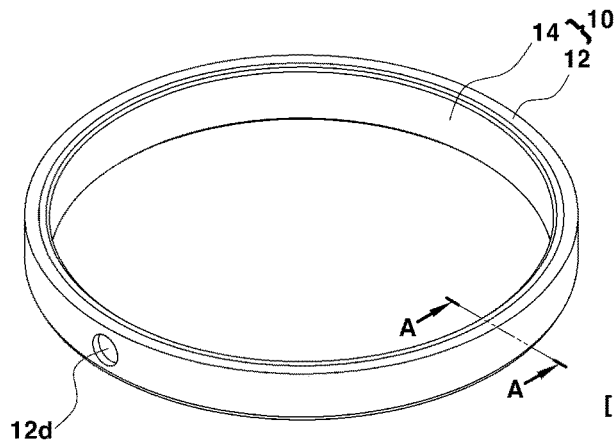
FIG. 4A is a view illustrating a stator support member of a rotating electrical machine in accordance with one form of the present disclosure.
Figure 4B:
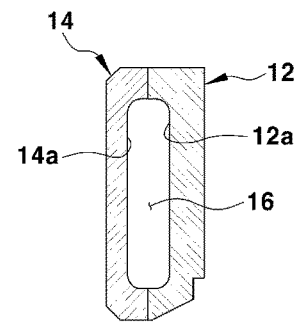
FIG. 4B is a cross-sectional view taken along line A-A of FIG. 4A.
Figure 5A:
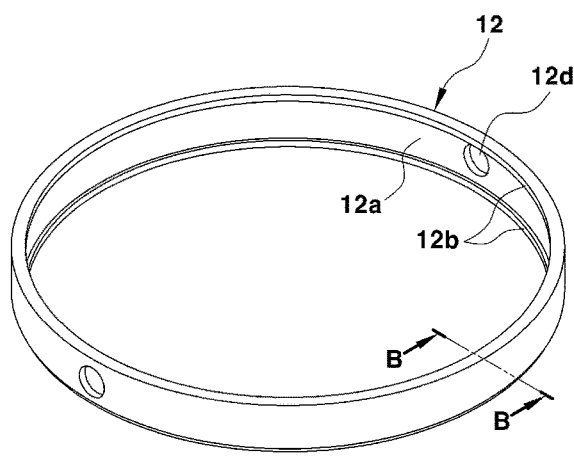
FIG. 5A is a view illustrating an outer part of the stator support member in one form of the present disclosure.
Figure 5B:
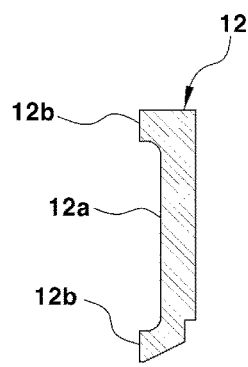
FIG. 5B is a cross-sectional view taken along line B-B of FIG. 5A.
Figure 8A:
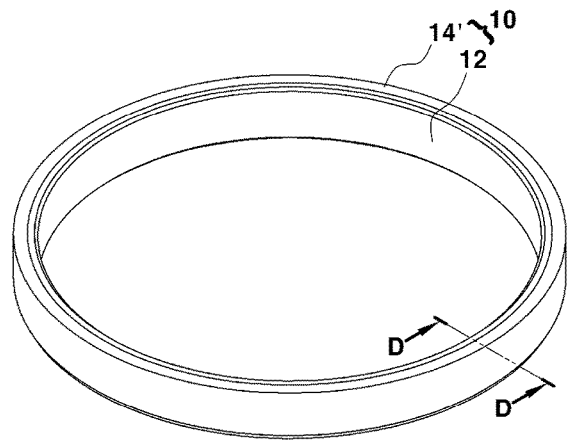
FIG. 8A is a view illustrating a support member in another form of the present disclosure.
Figure 8B:
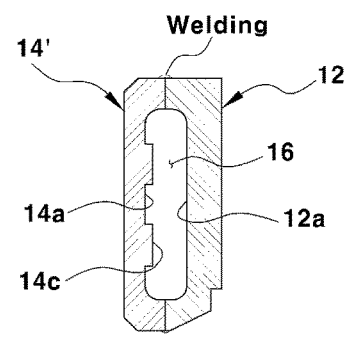
FIG. 8B is a cross-sectional view taken along line D-D of FIG. 8A.
Figure 9A:
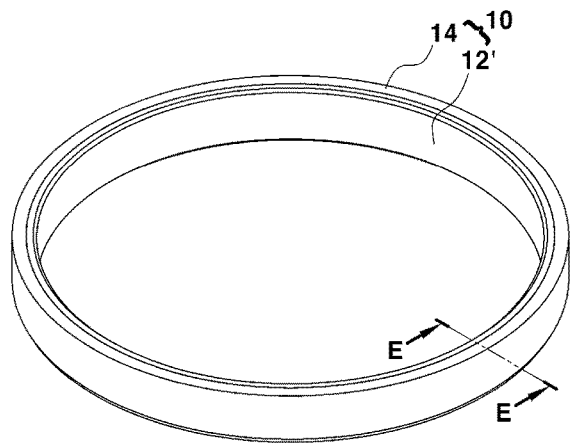
FIG. 9A is a view illustrating a support member in other form of the present disclosure.
Figure 9B:
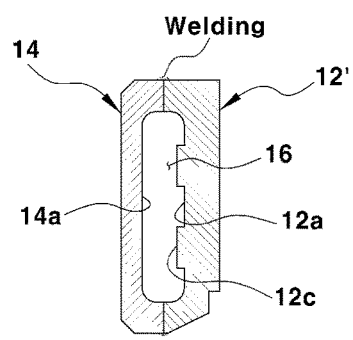
FIG. 9B is a cross-sectional view taken along line E-E of FIG. 9A.

FIGS. 4A-4B are views illustrating a stator support member of a rotating electrical machine in one form of the present disclosure, FIGS. 5A-5B are views illustrating an outer part of the stator support member in one form of the present disclosure, FIGS. 6A-6B are views illustrating an inner part of the stator support member in one form of the present disclosure, FIGS. 7A-7B are views illustrating a cooling channel of a sealed structure formed by combining the outer part and the inner part together in one form of the present disclosure, FIGS. 8A-8B are views illustrating a stator support member in another form of the present disclosure, and FIGS. 9A-9B are views illustrating a stator support member in other form of the present disclosure.

A stator support member 10 causes a concentrated winding segmented core type stator to be press-fitted thereinto so as to be located on the inner surface of the stator support member 10 and thus serves to fix segmented cores arranged in a ring shape. As shown in FIGS. 4A-4B, the stator support member 10 has a ring-shaped structure and a cooling channel 16, in which a cooling fluid to cool the stator flows, is provided in the stator support member 10.

As illustrated in FIGS. 4A to 6B, the stator support member 10 includes an outer part 12 and an inner part 14, divided from each other in the longitudinal direction based on the cooling channel 16 so as to be concentric with each other and, when the outer part 12 and the inner part 14 are bonded, the cooling channel 16 of the stator support member 10 having a sealed structure is completed so that the cooling fluid may flow along the cooling channel 16 without leakage.

As shown in FIGS. 5A-5B, the outer part 12 is a ring-shaped band having a first cooling channel wall surface part 12a on the inner circumferential surface thereof, and has an approximately ⊏-shaped longitudinal-section.

The outer part 12 is concentric with the inner part 14 when the outer part 12 and the inner part 14 are bonded, both side ends of the outer part 12 in the height direction are processed to be bent in the centripetal direction of the outer part 12 and thus the outer part 12 has a ⊏-shaped longitudinal-section, and the ⊏-shaped inner surface of the outer part 12 forms the first cooling channel wall surface part 12a surrounding one side of the cooling channel 16 in the circumferential direction.

Further, tips of both side ends of the outer part 12 bent in the centripetal direction of the outer part 12 form first bonding surface parts 12b hermetically attached to the inner part 14 when the outer part 12 and the inner part 14 are bonded.

The first cooling channel wall part 12a extends in the circumferential surface direction of the outer part 12 without disconnection, and the first bonding surface parts 12b are connected to both ends of the first cooling channel wall part 12a in the height direction of the outer part 12.

That is, the first cooling channel wall part 12a is formed between both first bonding surface parts 12b hermetically attached to the inner part 14.

Further, a cooling fluid hole 12d to pass a cooling fluid is provided in the outer part 12.

With reference to FIGS. 6A-6B, the inner part 14 is a ring-shaped band having a second cooling channel wall surface part 14a on the outer circumferential surface thereof, and has an approximately ⊏-shaped longitudinal-section.

The inner part 14 is concentric with the outer part 12 when the outer part 12 and the inner part 14 are bonded, both side ends of the inner part 14 in the height direction are processed to be bent toward the opposite to the centrifugal direction and thus the inner part 14 has a ⊏-shaped longitudinal-section, and the ⊏-shaped outer surface of the inner part 14 forms the second cooling channel wall surface part 14a surrounding the other side of the cooling channel 16 in the circumferential direction.

Further, tips of both side ends of the inner part 14 bent toward the opposite to the centrifugal direction of the inner part 14 form second bonding surface parts 14b hermetically attached to the outer part 12 when the outer part 12 and the inner part 14 are bonded.

The second cooling channel wall part 14a extends in the circumferential surface direction of the inner part 14 without disconnection, and the second bonding surface parts 14b are connected to both ends of the second channel wall part 14a in the height direction of the inner part 14.

That is, the second cooling channel wall part 14a is formed between both second bonding surface parts 14b hermetically attached to the outer part 12.

Combination of the outer part 12 and the inner part 14 is carried out under the condition that the inner part 14 is disposed within the outer part 12 so as to be concentric with each other and the first bonding surface parts 12b of the outer part 12 and the second bonding surface parts 14b of the inner part 14 hermetically contact each other, thereby forming the cooling channel 16 in a hermetically sealed state, surrounded with the first cooling channel wall surface part 12a and the second cooling channel wall surface part 14a (with reference to FIG. 7).

As shown in FIGS. 8A-8B and 9A-9B, one or more protrusions may be formed on at least one of the first cooling channel wall surface part 12a and the second cooling channel wall surface part 14a.

First, as shown in FIGS. 8A-8B, if protrusions 14c are formed on a second cooling channel wall surface part 14a of an inner part 14', one or more protrusions 14c may protrude from the surface of the second cooling channel wall surface part 14a.

The protrusions 14c are formed in the shape of ribs extending in the circumferential surface direction of the second cooling channel wall surface part 14a without disconnection in consideration of the flow of a cooling fluid flowing along the cooling channel 16. The protrusions 14c increase a radiant heat area of the second cooling channel wall surface part 14a contacting the cooling fluid and thus assist in effective cooling of the stator adjacent to the inner circumferential surface of the inner part 14'.

If a plurality of protrusions 14c are formed, the protrusions 14c are spaced apart from each other in the height direction of the inner part 14'.

Further, as illustrated in FIGS. 9A-9B, if protrusions 12c are formed on a first cooling channel wall surface part 12a of an outer part 12', one or more protrusions 12c may protrude from the surface of the first cooling channel wall surface part 12a.

The protrusions 12c are formed in the shape of ribs extending in the circumferential surface direction of the first cooling channel wall surface part 12a without disconnection in consideration of the flow of the cooling fluid flowing along the cooling channel 16. The protrusions 14c cause irregular current in the flow of the cooling fluid to increase turbulence and thus assist in effective cooling of the stator.

Although not shown in the drawings, the stator 200 including a plurality of concentrated winding segmented cores 210 arranged in a ring shape, shown in FIG. 1A, is press-fitted into the stator support member 10 during a process of assembling a rotating electrical machine and, thus, the stator support member 10 may support and fix the ring-shaped arrangement of the press-fitted segmented cores 210.

Hereinafter, a method of manufacturing the above-described two piece-type support member 10 will be described.

First, ring-shaped structures forming the stator support member 10, i.e., the outer part 12 and the inner part 14, are individually molded.

The outer part 12 is a ring-shaped band having the first cooling channel wall surface part 12a on the inner circumferential surface thereof, and the inner part 14 is a ring-shaped band having the second cooling channel wall surface part 14a on the outer circumferential surface thereof.

The outer part 12 and the inner part 14 have a simple structure having a □-shaped longitudinal-section, which may be formed by forging, and are thus respectively formed by forging. Thereafter, the outer part 12 and the inner part 14 are bonded under the condition that the first cooling channel wall surface part 12a and the second cooling channel wall surface part 14a face each other, thereby completing the formation of the cooling channel 16 in a hermetically sealed state, surrounded with the first cooling channel wall surface part 12a and the second cooling channel wall surface part 14a.

Even if the outer part 12 and the inner part 14 are manufactured by casting, a core material, a flushing hole, etc. may be omitted.

The separately formed outer part 12 and inner part 14 may be bonded through welding. Here, after the inner part 14 is disposed within the outer part 12 so that the first bonding surface parts 12b of the outer part 12 and the second bonding surface parts 14b of the inner part 14 contact each other. Welding is executed at the contact surfaces between the first bonding surface parts 12b and the second bonding surface parts 14b, thereby fixing the outer part 12 and the inner part 14 in a state in which the outer part 12 and the inner part 14 hermetically contact each other.

The above-described stator support member 10 of the rotating electrical machine, which is manufactured by separately forming two pieces having a simple structure and then combining the two pieces together so as to form the cooling channel 16, has advantages, as follows.

First, since the outer part 12 and the inner part 14 forming the stator support member 10 have a simple structure, the outer part 12 and the inner part 14 may be easily processed by forging rather than casting using a core material.

Therefore, various defects, such as air bubbles, cold shut, etc., which may be generated when casting is carried out, may be avoided, and the outer part 12 and the inner part 14 are separately formed by forging and thus manufacturing quality may be improved.

Further, a core material, a flushing hole, etc. desired to execute casting may be omitted and thus productivity may be improved.

Second, since the stator support member 10 is manufactured by combining the outer part 12 and the inner part 14 together, divided based on the cooling channel 12, visual inspection of the outer part 12 and the inner part 14 may be easily carried out prior to a combination process and thus manufacturing quality may be improved.

In case of a conventional support member manufactured by casting, visual inspection of a cooling channel wall surface part formed in the conventional support member is not enabled.

Third, the protrusions 12c and 14c to increase a radiant heat area or to increase turbulence like a cooling fin may be easily added to the cooling channel wall surface parts 12a and 14a surrounding the cooling channel 16 and thus cooling performance may be improved.

As is apparent from the above description, a stator support member of a rotating electrical machine is manufactured by separately forming two pieces having a simple structure and then combining the two pieces together so as to form a cooling channel therein, thus improving cooling performance, productivity and quality level while maintaining the same external structure.

The present disclosure has been described in detail with reference to forms thereof. However, it will be appreciated by those skilled in the art that changes may be made in these forms without departing from the principles and spirit of the present disclosure.

What is claimed is:

1. A stator support member of a rotating electrical machine to support a stator formed of a plurality of segmented cores arranged in a ring shape, the stator support member comprising:
   a ring-shaped outer part provided with a first cooling channel wall surface part formed on an inner circumferential surface thereof;
   a ring-shaped inner part provided with a second cooling channel wall surface part formed on an outer circumferential surface thereof; and
   a cooling channel surrounded with the first cooling channel wall surface part and the second cooling channel wall surface part by combining the ring-shaped outer part and the ring-shaped inner part together,
   wherein one or more protrusions are formed on each of the first cooling channel wall surface part and the second cooling channel wall surface part, and
   wherein:
      the protrusions are formed in a shape of ribs extending in a circumferential surface direction of each of the first cooling channel wall surface part and the second cooling channel wall surface part without disconnection, and
      the protrusions of the first cooling channel wall surface part and the second cooling channel wall surface part are configured to form an irregular cross section of the cooling channel and increase turbulence in a cooling fluid of the cooling channel.

2. A method of manufacturing a stator support member of a rotating electrical machine to support a stator formed of a plurality of segmented cores arranged in a ring shape, the method comprising:
   forming a ring-shaped outer part provided with a first cooling channel wall surface part formed on an inner circumferential surface thereof, and a ring-shaped inner part provided with a second cooling channel wall surface part formed on an outer circumferential surface thereof; and
   forming a cooling channel surrounded with the first cooling channel wall surface part and the second cooling channel wall surface part by combining the ring-shaped outer part and the ring-shaped inner part together, wherein one or more protrusions are formed on each of the first cooling channel wall surface part and the second cooling channel wall surface part, and the protrusions are formed in a shape of ribs extending in a circumferential surface direction of each of the first cooling channel wall surface part and the second cooling channel wall surface part without disconnection, and the protrusions of the first cooling channel wall surface part and the second cooling channel wall surface part are configured to form an irregular cross section of the cooling channel and increase turbulence in a cooling fluid of the cooling channel.

3. The method of claim 2, wherein, first bonding surface parts are formed at both side ends of the first cooling channel wall surface part, second bonding surface parts are formed at both side ends of the second cooling channel wall surface part, and, in the forming of the cooling channel, the ring-shaped outer part and the ring-shaped inner part are fixed to each other by welding while the first bonding surface parts and the second bonding surface parts contact each other.

4. The method of claim 2, wherein the ring-shaped outer part and the ring-shaped inner part are processed by forging.

\* \* \* \* \*